United States Patent
Palmer et al.

(10) Patent No.: US 12,042,085 B2
(45) Date of Patent: Jul. 23, 2024

(54) APPARATUS FOR PROVIDING A BREWED BEVERAGE

(71) Applicant: KENWOOD LIMITED, Havant (GB)

(72) Inventors: Paul Palmer, Havant (GB); James Joseph Sealy, Havant (GB); Bradley Cunningham, Havant (GB); Robert Fields, Havant (GB); Gilman Grundy, Havant (GB)

(73) Assignee: KENWOOD LIMITED (GB)

( * ) Notice: Subject to any disclaimer, the term of this patent is extended or adjusted under 35 U.S.C. 154(b) by 731 days.

(21) Appl. No.: 16/975,156

(22) PCT Filed: Feb. 25, 2019

(86) PCT No.: PCT/GB2019/050508
§ 371 (c)(1),
(2) Date: Aug. 24, 2020

(87) PCT Pub. No.: WO2019/166785
PCT Pub. Date: Sep. 6, 2019

(65) Prior Publication Data
US 2021/0093120 A1    Apr. 1, 2021

(30) Foreign Application Priority Data

Mar. 2, 2018 (GB) ..................................... 1803452
May 2, 2018 (LU) ..................................... 100786

(51) Int. Cl.
*A47J 31/32*        (2006.01)
*A47J 31/06*        (2006.01)
(Continued)

(52) U.S. Cl.
CPC ......... *A47J 31/468* (2018.08); *A47J 31/0663* (2013.01); *A47J 31/10* (2013.01);
(Continued)

(58) Field of Classification Search
CPC ......... A47J 31/057; A47J 31/10; A47J 31/24; A47J 31/32; A47J 31/42; A47J 31/5251
See application file for complete search history.

(56) References Cited

U.S. PATENT DOCUMENTS

| 5,014,611 A | 5/1991 | Illy et al. |
| 10,635,921 B2 | 4/2020 | Palmer et al. |
| (Continued) | | |

FOREIGN PATENT DOCUMENTS

| CN | 104586267 A | 5/2015 |
| CN | 106998947 A | 8/2017 |
| (Continued) | | |

OTHER PUBLICATIONS

Second Office Action for corresponding Chinese Application No. 201980014919.7 dated Jul. 20, 2022, with English translation (17 Pages).

(Continued)

*Primary Examiner* — Reginald Alexander
(74) *Attorney, Agent, or Firm* — Harness, Dickey & Pierce, P.L.C.

(57) ABSTRACT

An apparatus for providing an infused or brewed beverage comprises a brewing arrangement which is configured to brew a beverage according to a selected one of a plurality of brewing processes, at least one being a hot brewing processes and at least one being a cold brewing process. The apparatus includes a controller configured to receive a user selection indicative of a required beverage, and to control the brewing arrangement in dependence upon the user selection. The apparatus may for example be used to provide either hot brew or cold brew coffee as required, without the need for multiple machines.

14 Claims, 4 Drawing Sheets

(51) Int. Cl.
    *A47J 31/10*     (2006.01)
    *A47J 31/34*     (2006.01)
    *A47J 31/42*     (2006.01)
    *A47J 31/44*     (2006.01)
    *A47J 31/46*     (2006.01)
    *A47J 31/52*     (2006.01)
    *A47J 31/24*     (2006.01)
    *B01F 23/237*     (2022.01)

(52) U.S. Cl.
    CPC ............... *A47J 31/32* (2013.01); *A47J 31/34* (2013.01); *A47J 31/42* (2013.01); *A47J 31/4403* (2013.01); *A47J 31/467* (2013.01); *A47J 31/5251* (2018.08); *A47J 31/5253* (2018.08); *A47J 31/24* (2013.01); *B01F 23/237621* (2022.01); *B01F 23/23765* (2022.01)

(56) References Cited

U.S. PATENT DOCUMENTS

| | | | |
|---|---|---|---|
| 10,695,772 | B2 | 6/2020 | Palmer et al. |
| 2003/0234212 | A1 | 12/2003 | Ito et al. |
| 2008/0175963 | A1 | 7/2008 | Pope |
| 2009/0255408 | A1 | 10/2009 | Lassota et al. |
| 2012/0156337 | A1 | 6/2012 | Studor et al. |
| 2013/0189404 | A1* | 7/2013 | Ha .................... A47J 31/04 222/401 |
| 2014/0242239 | A1* | 8/2014 | Boggavarapu ...... A47J 31/4492 426/433 |
| 2015/0072058 | A1 | 3/2015 | Johnson |
| 2016/0073819 | A1 | 3/2016 | Licare |
| 2017/0079467 | A1* | 3/2017 | Ait Bouziad ....... A47J 31/4403 |
| 2017/0099980 | A1 | 4/2017 | Haidar et al. |
| 2017/0119195 | A1* | 5/2017 | Al-Shaibani .......... A47J 31/521 |
| 2017/0290354 | A1 | 10/2017 | Pabst et al. |
| 2017/0360243 | A1 | 12/2017 | Crowne |
| 2018/0055289 | A1* | 3/2018 | Al-Shaibani .............. B07B 1/42 |
| 2018/0098658 | A1* | 4/2018 | Angell ................... A47J 31/44 |
| 2018/0332997 | A1* | 11/2018 | Kang ..................... A47J 31/525 |
| 2019/0231118 | A1* | 8/2019 | Nishikawa ............. A47J 31/002 |
| 2019/0328170 | A1* | 10/2019 | Cai ........................ A47J 31/407 |
| 2020/0093331 | A1 | 3/2020 | Cunningham |
| 2020/0117932 | A1 | 4/2020 | Palmer et al. |
| 2020/0288901 | A1* | 9/2020 | De' Longhi ........ A47J 31/0652 |
| 2021/0401220 | A1* | 12/2021 | Schlack .................. A47J 31/42 |

FOREIGN PATENT DOCUMENTS

| | | |
|---|---|---|
| EP | 1764015 A1 | 3/2007 |
| EP | 3280302 A1 | 2/2018 |
| JP | H10302141 A | 11/1998 |
| WO | WO-2009017428 A1 | 2/2009 |
| WO | WO-2011094677 A2 | 8/2011 |
| WO | WO-2011132101 A1 | 10/2011 |
| WO | 2012146660 A1 | 11/2012 |
| WO | WO-2017125749 A2 | 7/2017 |
| WO | 2018-015746 A1 | 1/2018 |

OTHER PUBLICATIONS

Chinese Office Action dated Feb. 18, 2022 for Application No. 201980014919.7 (with English tranlsation) 8 pages.
UK Examination Report dated Feb. 7, 2022 for Application No. GB1803452.0 (5 pages).
Sarah Trivuncic, Sep. 26, 2014, Dolce Gusto Mini Me Review—Delonghi Nescafé coffee machine, YouTube.com [online], Available from: https://www.youtube.com/watch?v=nHxAR4SsdUk, and screen shot, 1 page [Accessed Feb. 4, 2022].
Examination Report for Application No. GB1803452.0 dated Sep. 27, 2022 (4 pages).
International Search Report and Written Opinion of the ISA issued in PCT/GB2019/050508, mailed Jun. 11, 2019; ISA/EP.
GB Search Report of the Intellectual Property Office issued in Application No. GB1803452.0, claims 1-18, dated Aug. 31, 2018.
GB Search Report of the Intellectual Property Office issued in Application No. GB1803452.0, claims 29-35, dated Dec. 3, 2018.
LU Search Report of the Intellectual Property Office issued in Application No. LU100786, claims 1-17, dated Jul. 2, 2019.

\* cited by examiner

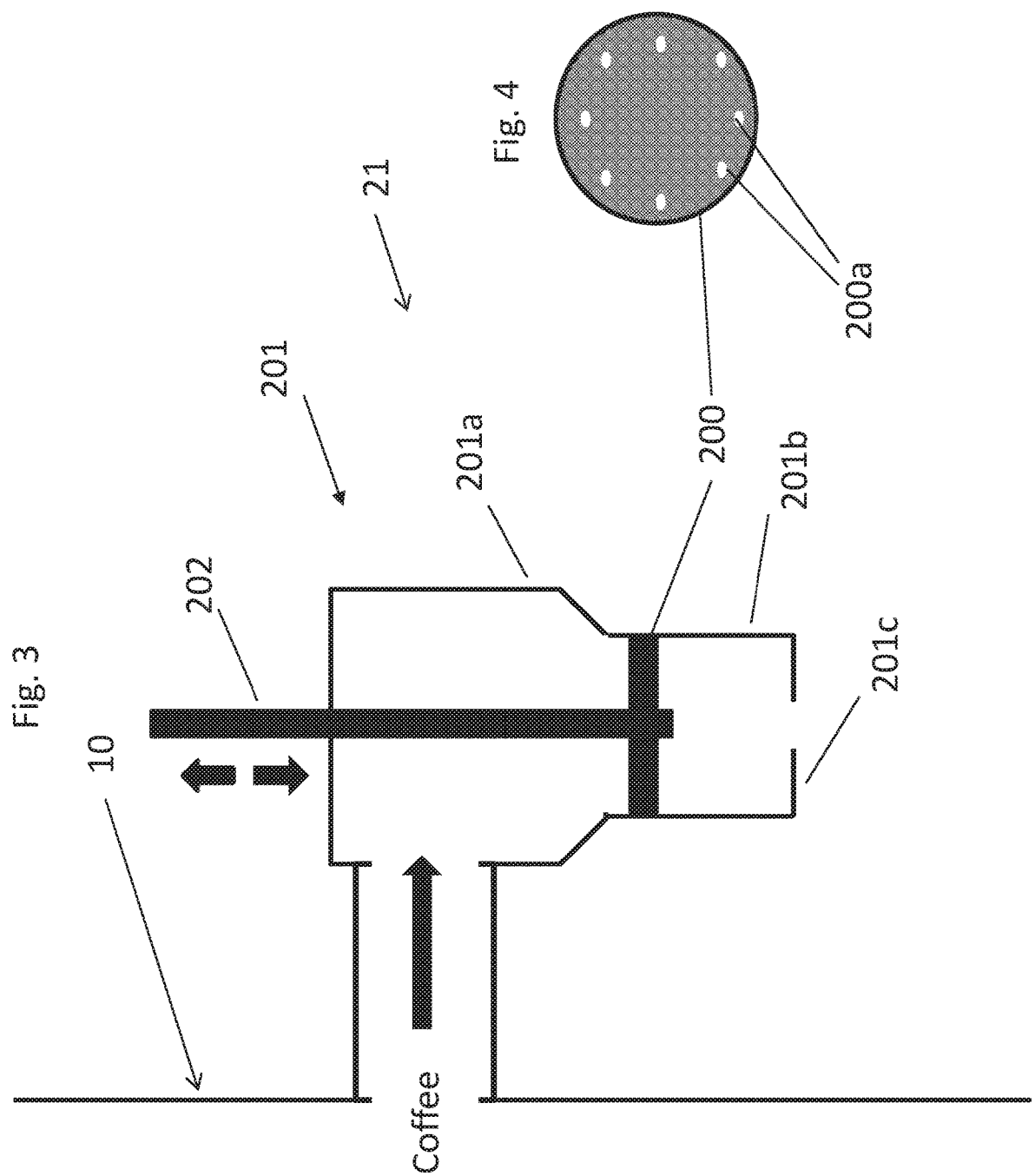

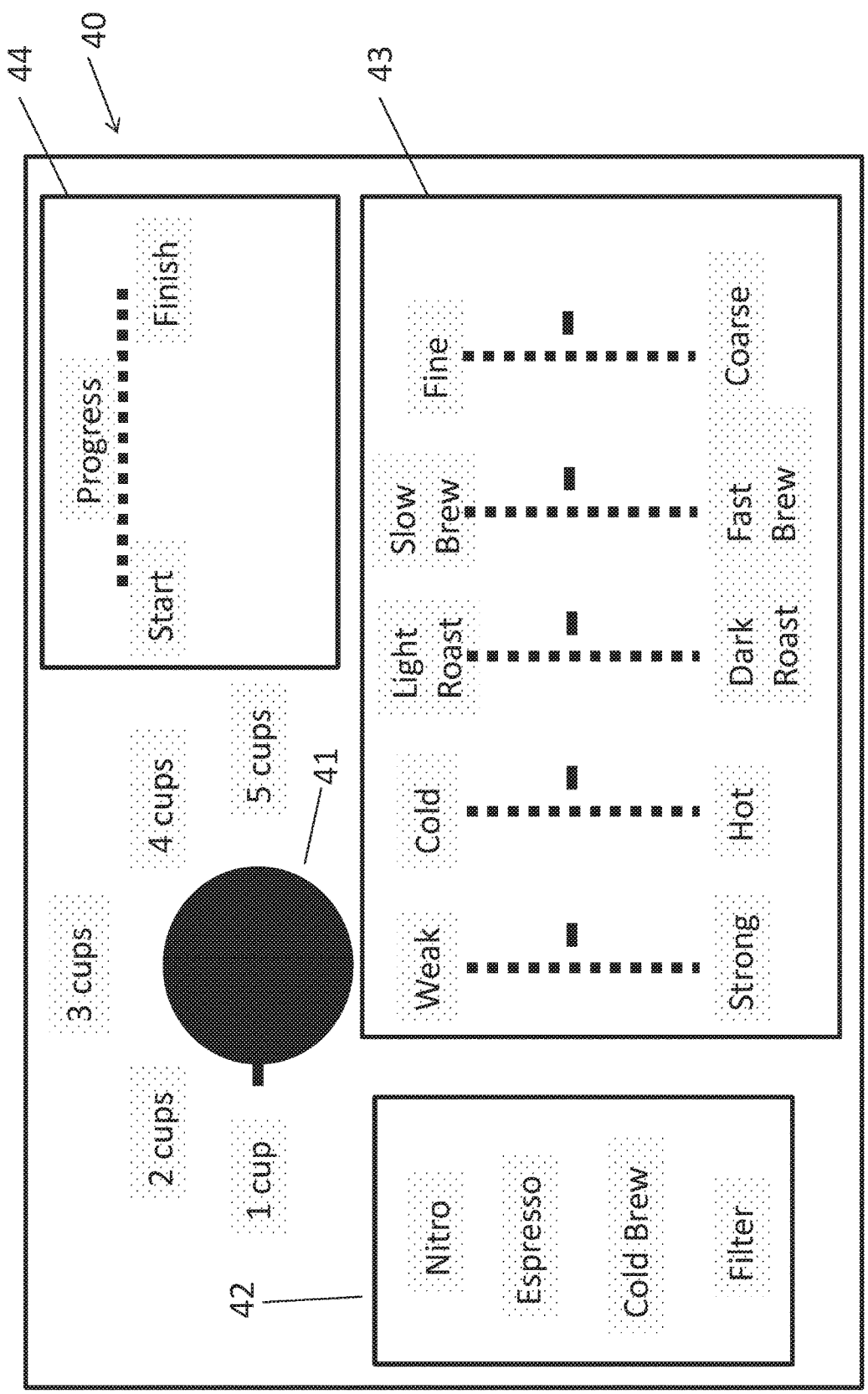

APPARATUS FOR PROVIDING A BREWED BEVERAGE

CROSS-REFERENCE TO RELATED APPLICATIONS

This application is a U.S. National Phase under 35 U.S.C. 371 of International Application No. PCT/GB2019/050508, filed Feb. 25, 2019, which claims the benefit of Great Britain Application No. GB1803452.0, filed Mar. 2, 2018 and Luxembourg Application No. LU100786, filed May 2, 2018. The disclosure of each of the above-identified applications is incorporated herein by reference.

INTRODUCTION

The present invention relates to a coffee machine or other machine for extracting solutes from a solid substrate or infusing/brewing substance via infusion, often known in this context as 'brewing'.

BACKGROUND

In recent years it has become increasingly popular to "cold-brew" coffee—that is, to brew coffee grounds by steeping them in unheated or even chilled water—as coffee brewed in this way has a less bitter taste. One of the draw-backs of cold-brewing is that it takes much more time to brew coffee to have the body and flavour typically favoured by consumers. Particularly when chilled, brewing can take as long as 72 hours. Additionally, current methods of cold-brewing are typically suited to commercial cold-brewing of large batches for sale in shops or commercially, and not for brewing in the home.

Various stand-alone machines have been proposed for carrying out cold-brewing domestically. However, these are typically no faster than the above-described cold-brewing method, and anyway require consumers to purchase them in addition to their pre-existing coffee machines which then take up space within the kitchen. Where these stand-alone machines have included a means of accelerating brewing (e.g., through agitation), these are typically complex and have resulted in unsatisfactory flavour.

Producing nitrogenated and/or carbonated coffee, particularly nitrogenated and/or carbonated cold-brew coffee is also becoming fashionable, however it is not convenient to make this in the home at present.

It is therefore desirable to provide a coffee machine capable of cold-brewing coffee that is capable of at least partially ameliorating the above-described problems of the prior art.

SUMMARY OF THE INVENTION

According to one aspect of the present invention, there is provided an apparatus for providing an infused (brewed) beverage comprising: a brewing arrangement configured to brew a beverage according to a selected one of a plurality of brewing processes, at least one being a hot brewing processes and at least one being a cold brewing process, and a controller configured to receive a user selection indicative of a required beverage, and to control the brewing arrangement in dependence upon the user selection. Thus the apparatus may be used to provide either hot brew or cold brew coffee as required, without the need for multiple (often expensive and large) machines.

It should be understood that references to 'brewing' in this application relate to an infusion process such as is commonly used for making tea or coffee. In this process a liquid such as water oil or alcohol may be brought to an appropriate temperature (for example boiled or cooled) and is then added to the substance, which is then allowed to steep in the liquid for a period of time. The liquid may then be strained or the substance otherwise removed from the liquid, in order to create an infusion which can be consumed as a flavoured beverage. This may be achieved simply by passing the liquid through the substance in a filter container, such as in a filter or drip coffee machine. Quantities of the substance and liquid used can vary according to the substance or how strong the infusion is required to be. A common proportion used might be about 28 g (or one ounce) of infusion substance to about 0.5 L (or one pint) of liquid.

The cold brewing process may comprise brewing a brewing substance with a fluid at a temperature of between 25° C. and 75° C., preferably at a temperature of between 30° C. and 50° C., and may also include a hot bloom process, comprising soaking the brewing substance in a pre-brew fluid, optionally at a temperature above 80 degrees C., before brewing with the brewing fluid in the brewing chamber. The hot brewing process may comprise brewing a brewing substance with fluid at a temperature at or near boiling point. The plurality of brewing processes preferably comprises at least one of: a filter coffee brewing process; a drip brewing process; a nitrogenated brewing process; and an espresso brewing process.

Preferably, the brewing arrangement comprises a brewing chamber having an inlet for a brewing substance and a brewing fluid, and an outlet for the brewed fluid. The user selection may be indicative of a volume of the beverage, a quantity a brewing substance, a brewing time, a coarseness of a brewing substance, and a brew strength, in addition to a selected brewing process.

Preferably, the apparatus comprises a temperature sensor and the controller is configured to control the temperature of brewing fluid in the brewing chamber. For example, there is preferably a heater configured to heat the brewing chamber and/or a brewing substance contained in the brewing chamber, and/or the brewing fluid.

The apparatus may also comprise a grinder configured to grind the brewing substance, the grinder preferably being controllable to provide a selected coarseness of the ground material. For example, the grinder may comprise a pair of grinding elements, and be controllable to change the distance between the grinding elements. This control may be dependent upon the brewing process used, so that when the user selection indicates a cold brewing process, the controller is configured to control the grinder to grind the substance such that the average particle size is between 1150 and 1600 microns, more preferably the average particle size is between 1300 and 1400 microns, yet more preferably the average particle size is approximately 1350 microns.

Preferably, there is provided a pressurising arrangement configured to pressurise the brewing chamber, where preferably the pressurising arrangement is configured selectively to increase the pressure within the brewing chamber to a level above atmospheric pressure during a hot brew process, or to decrease the pressure to a level below atmospheric pressure during a cold brew process. This may decrease the brewing time.

Preferably, there is provided a storage container for storing a brewed beverage, preferably wherein the storage container is in communication with the outlet of the brewing chamber. This enables the storage of a brewed beverage which may be dispensed according to a user selection, and is particularly useful for a cold brewed beverage, where the taste does not degrade as quickly as a hot brewed beverage. The storage container may include a level sensor, and the controller may be configured to provide further brewed beverage according to the output of the level sensor.

Preferably, there is at least one filter for the brewing substance, preferably located within at least one of: the brewing chamber; the chamber outlet; and a dispensing outlet of the apparatus for dispensing the brewed beverage. This separates solid substances—such as coffee grounds—from the brewed beverage.

Preferably, there is a pump configured to convey a brewing substance through the chamber outlet.

Preferably, there is provided an agitating arrangement configured to agitate contents of the brewing chamber, preferably wherein the agitating arrangement is at least one of: a stirrer, a pump, and a pressurised gas. For example, the brewing fluid may be circulated through the filter, and thus over the brewing substance.

Preferably, the brewing chamber comprises a pH sensor arranged to sense the pH value of the brewing fluid, and the controller is configured to control one or more parameters of the brewing process and/or of the brewing arrangement in dependence upon the output of this pH sensor. Preferably, the parameters comprise at least one of: the volume of fluid supplied to the brewing chamber; the temperature of fluid and/or brewing substance supplied to or contained in the brewing chamber; the duration of brewing. Thus, the beverage may be produced with a desirable pH, where the pH may have an effect upon the taste of the brewed beverage.

According to another aspect of the invention, there is provided an apparatus for making a brewed beverage comprising: a brewing arrangement having a brewing chamber; a pH sensor arranged to sense the pH value of the brewing fluid; and a controller configured to control one or more parameters of the brewing process and/or brewing arrangement in dependence upon the output of the pH sensor, preferably wherein the parameters comprise at least one of: the volume of fluid supplied to the brewing chamber; the temperature of fluid and/or brewing substance supplied to or contained in the brewing chamber; the duration of brewing.

Preferably the controller is configured to control the one or more parameters to obtain a predetermined beverage pH value, preferably of between 4.9 and 6, more preferably of between 5.4 and 5.7, yet more preferably of 5.5, and/or to obtain a pH value of the beverage corresponding to a user selection. As aforementioned, the pH of a beverage is known to have an effect upon the taste of that beverage. Controlling the pH may be used to obtain an optimally flavoured beverage.

There may be a neutralising arrangement configured selectively to deliver a neutralising substance, preferably comprising calcium carbonate and/or magnesium oxide, to the beverage to vary the pH of the beverage. The neutralising arrangement is preferably arranged to deliver the neutralising substance upstream of the inlet of a brewing chamber, within a brewing chamber, or downstream of the outlet of a brewing chamber.

Preferably, there is provided: at least one sensor comprising a chromatographic sensor and/or a spectrometer, and the controller is arranged to control one or more components of the brewing arrangement dependent upon the output of the sensor, and the user selection. These sensors may be used to detect when the beverage brewing process should be stopped so as to achieve an optimal taste.

The apparatus may also include a roaster for roasting a brewing substance, preferably where the controller is arranged to control the roaster in dependence upon at least one of: the output of a temperature sensor; the output of a colour sensor; and/or the output of a timer, and a property of the substance.

A restrictor plate may be located at an outlet of the brewing arrangement, wherein the restrictor plate contains one or more apertures and the restrictor plate is moveable between a first position obstructing the outlet, and a second position not obstructing the outlet, preferably wherein the restrictor plate is further moveable to a third position partially obstructing the outlet. A dispensing arrangement may be configured to dispense the brewed beverage through the restrictor plate at a pressure of no less than 25 PSI, preferably at no less than 30 PSI, more preferably at between 30 and 40 PSI. Preferably, there is provided a pressurised gas source arranged to selectively add a gas to the brewing fluid before dispensing through the restrictor plate.

According to another aspect of the present invention, there is provided an apparatus for providing a brewed beverage, comprising: a brewing arrangement, configured to brew a beverage; and a pressurised gas source arranged to selectively add a gas to the brewing fluid.

Preferably, the pressurised gas source is arranged to selectively add a gas to the fluid before brewing the beverage with the fluid, or during brewing with the fluid, or after brewing with the fluid. Each of these may have differing effects on the brewing of the beverage, and the mouth feel of the brewed beverage.

Preferably, the pressurised gas source comprises a source of carbon dioxide and/or nitrogen, preferably wherein the amount of carbon dioxide is at least about 25%, and preferably at least about 30%. The pressurised gas source may be configured to provide gas at no less than 25 PSI, preferably at no less than 30 PSI, more preferably at between 30 and 40 PSI.

Preferably, there is provided a pressurising arrangement for pressurising fluid in the brewing apparatus, preferably where the fluid is pressurised to a pressure where the gas dissolves in the fluid, and preferably wherein the fluid is pressurised in the brewing chamber.

A dilution arrangement may be provided for diluting a brewed beverage with a fluid, preferably wherein the fluid is water. This dilution may be used to alter the strength of the brewed beverage before dispensing, and the use of water may result in little, or no, potentially contrasting tastes being imparted to the beverage during dilution. Preferably the beverage is coffee or tea, and the apparatus is preferably a domestic or kitchen appliance.

The invention extends to methods and/or apparatus substantially as herein described and/or as illustrated with reference to the accompanying drawings.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

As used herein, means plus function features may be expressed alternatively in terms of their corresponding structure, such as a suitably programmed processor and associated memory, for example.

Aspects and embodiments of the invention are set out in the appended claims. These and other aspects and embodiments of the invention are also described herein.

At least one embodiment of the invention will now be described, by way of example only, with reference to the accompanying drawings, in which:

FIG. 3 is a schematic side-on cut-away drawing showing an outlet suitable for the machine of FIG. 1;

FIG. 4 is a schematic plan view of a restrictor plate for use in the outlet of FIG. 3; and, FIG. 5 is a top-down view of a user interface suitable for the machine of FIG. 1.

EXEMPLARY MACHINE

Figure 1:
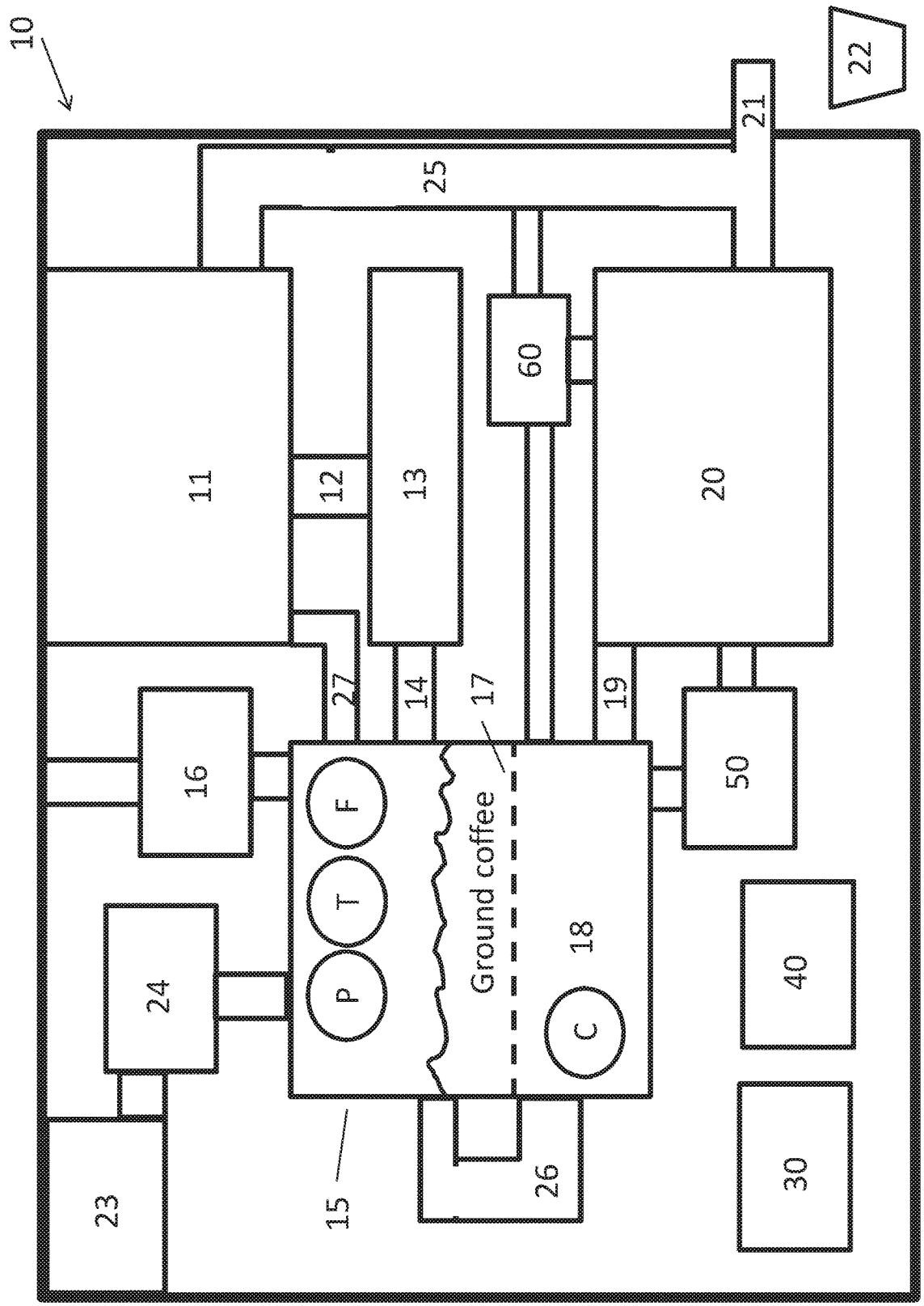
FIG. 1 is a schematic cut-away, drawing showing a machine for brewing coffee.

FIG. 1 shows a coffee machine 10 capable of cold-brewing coffee. The machine 10 includes a water reservoir 11, which may be filled manually or be connected to mains water and filled automatically. The water reservoir 11 is connected via a pipe 12 to a heating and/or cooling element 13. Water may flow from the reservoir 11 to the heating and/or cooling element and the brewing chamber 15, either driven by gravity, with the assistance of a pump, or by pressure from a mains water supply.

The pipe 12 (and every other pipe disclosed here) may be closed by an automatically-actuatable valve at one, or both, ends to control flow of water or other material through it. All valves/gates may be automatically controlled by a controller, CPU 30.

Once a desired water-temperature is achieved, heated/cooled/room-temperature water may then flow from heating and/or cooling element 13 through the pipe 14 to the brewing chamber 15 for brewing the ground coffee located in the brewing chamber 15. Alternatively the heating and/or cooling element 13 may be a "through-flow" type element through which water flows continually, or may be omitted, or avoided via optional by-pass pipe 27, where RTP (room temperature and pressure) or ambient water is desired.

A filter 17 may be provided in the brewing chamber 15, through which water flows into a collection chamber 18 in the lower part of the brewing chamber 15. Water may be continually or periodically cycled over the ground coffee via pipe 26 (which may include a pump or other means for driving the water) from the collection chamber 18.

Ground coffee is either placed in the brewing chamber 15 manually, or ground by a grinder 24 which receives coffee beans from a bean-reservoir 23 and deposits the ground coffee automatically into the brewing chamber 15 via suitable pipes. The grinder 24 may be a burr-grinder, roller-grinder, auger, shredding disc or any other suitable grinding element and either manually-operated or automatically controlled by the CPU 30. Alternatively, the coffee may be provided in a capsule which is either manually or automatically loaded into the brewing chamber 15 and pierced/opened for brewing.

The brewing chamber 15 is optionally pressurised or de-pressurised by pump 16 which communicates with both the brewing chamber 15 and the external environment via suitable pipes.

The brewing chamber 15 and/or collection chamber 18 may include pressure sensors (P), temperature sensors (T), flow-rate sensors (F), and chemical sensors (C) for providing feedback to the CPU 30 for controlling the brewing process. The CPU 30 may additionally or alternatively include a timer for controlling the brewing process.

Once predetermined conditions (pressure, time, temperature, chemical etc.) within the brewing chamber 15 are detected by the CPU 30 corresponding to a desired end-goal, the brewed coffee is dispensed via a pipe 19 into the brewed coffee reservoir 20. The brewed coffee reservoir 20 may include a suitable heating and/or cooling element for maintaining the beverage within it at a desired temperature—for example for refrigerating for storage, or heating where a hot beverage is desired or may be used to sterilise the beverage within it. Further elements may be provided within the beverage reservoir to deter microbial growth, such as an ultra-violet light-source.

A user interface 40 electronically connected to the CPU 30 is provided in the machine 10 for allowing user control of the machine 10. The user may input instructions indicating a desired beverage and quantity of beverage which the machine 10 will then output into a suitable beverage receptacle 22 through outlet 21. The receptacle or coffee reservoir 20 may be a removable receptacle from which the coffee may be poured, similar to the carafe of a traditional drip-coffee machine, in which case an additional outlet may not be necessary.

The coffee reservoir 20 may include a level sensor for sensing a level of the liquid within the reservoir which provides feedback to the CPU. The CPU may then control the machine 10 to prepare more coffee, if the feedback from the level-sensor shows that the coffee reservoir 20 is becoming empty.

Where the machine 10 already has a beverage corresponding to the user input within reservoir 20, it may output this beverage directly to the user. Where the desired beverage is not contained within the container 20 the CPU will control the machine 10 to prepare such a beverage. Where the beverage is contained in the reservoir 20, but in concentrated form, the CPU may control valves associated with a pipe 25 connecting the water reservoir 11 with the outlet 21 to dilute the beverage prior to or during dispensing into the receptacle 22. Where the beverage is contained in the receptacle 20 but not at a desired temperature, the beverage can be heated/cooled to the desired temperature using suitable heating/cooling elements prior to dispensing. Additionally water may be directly output from the water reservoir 11 to the receptacle 22 via the pipe 25 depending on the user instruction.

In addition or alternatively to providing the filter 17 within the brewing chamber 15, filters may be provided in the pipe 19 and/or the outlet 21.

Whilst the CPU 30 and user-interface 40 are shown associated with the machine 10, the machine may additionally or alternatively receive instructions and use processing resources that are remote to the machine. For example a mobile electronic device in wireless communication with the machine 10 may be used to both receive user instruction and to control the machine (or communicate with the CPU 30 to do so).

Cold-Brew Implemented in a Machine Capable of Hot-Brewing

The above coffee machine 10 may have a pre-programmed cold-brew setting where CPU 30 controls internal pumps, valves, and heating/cooling element of the appliance 10 to make cold-brew coffee according to a user selection.

Grinding of the coffee to an appropriate coarseness may be achieved by controlling the distance between two grinding elements of the grinder 24. An average particle size of 1150 microns to 1600 microns, and preferably roughly 1350 microns (give or take about 50 microns) is normally thought appropriate for cold-brewed coffee. A quantity of coffee to be ground for preparing cold-brew coffee depends on the quantity of coffee that the user wishes to make—they may select the quantity via the user interface 40.

The distance between the grinding elements may be controlled either manually or by the CPU 30 in response to user input. For example the two grinding elements of the grinder 24 may be the two elements of a burr-grinder or toothed roller-grinders, with the two elements being movable relative to each other using a solenoid or screw-arrangement.

A quantity of ground coffee automatically prepared by the machine 10 for making cold brew coffee is preferably increased (e.g., twice that required to make the same amount of hot-brewed coffee) relative to the amount of ground coffee that would be needed to produce the same amount of hot-brewed coffee. This increase in coffee grounds helps compensate for slower brewing by increasing the surface area of coffee in contact with water and the amount of flavonoids to be released. For example the water:coffee ratio may be 24:1 or less, and preferably from 4:1 to 9:1 by weight for producing a concentrate, and 10:1 to 18:1 for direct consumption.

The machine 10 may include a timer and/or TDS (total dissolved solids) sensor for detecting when an appropriate strength of cold-brew coffee is achieved. A known relationship between TDS and brewing-time may be used as feedback by the CPU 30 for controlling temperature, pressure, agitation, water-flow and other factors within the brewing chamber 15 for achieving a desired end-point TDS.

In a machine 10 that is also a cappuccino or espresso machine, cold-brew coffee may be achieved relatively quickly by providing the coffee to the brewing chamber 15 and, instead of providing the positive pressure and hot (roughly 90-97 degrees centigrade) water typically use to make cappuccino or espresso, providing water at a lower temperature (80 degrees or less, and preferably room temperature or less) and lower pressure (e.g., half an atmosphere or less) for carrying out rapid cold-brewing (e.g., in 10 minutes or less). Agitation means (e.g., a rotary stirrer) may also be provided in the brewing chamber 15 and activated when cold-brew coffee is required for speeding up brewing.

In a machine 10 that is also a drip-coffee machine a pump or gravity-feed is used rather than the steam-driven water circulation typically used in such machines—the pump may be activated only when cold brew coffee is selected or may be used for both hot-brewed and cold-brewed coffee.

The machine 10 may also have a "hot bloom" function, where the grounds are pre-soaked in a predetermined quantity of heated water for a predetermined period (e.g., 1-5 minutes with water at 90 degrees centigrade) prior to cold-brewing. This quantity of water for use in pre-brewing/"blooming" may be calculated based on the amount of coffee that the user wishes to make. For example, in making 500 ml of cold-brewed coffee at a 5:1 water:coffee ratio by weight, about 100-200 ml of hot water may be used to "hot bloom" about 100 grams of coffee, and preferably about 180 ml of hot water is used, with the remainder of the 500 ml being cold water. For larger or smaller quantities of coffee grounds similar ratios of hot water to coffee grounds may be used (i.e., about 1:1 to 2:1 hot water:coffee by weight, and preferably about 1.8:1). Where a "hot bloom" is used, the total brewing time may be shortened compared to completely cold-brewed coffee, for example by about 10-30%—this shortening may be carried out automatically by the CPU 30.

Water used in the "hot bloom" may be retained in the brewing chamber 15 during the rest of the brewing process before dispensing into the coffee reservoir 20 so that it is not wasted, with any bitterness created through the use of hot water diluted by the cold water. Alternatively it may be directed into the coffee reservoir 20 prior to continuing with the brewing process. In a further alternative it may be directed through a waste-outlet of the machine 10 so that it is not mixed with the cold-brewed coffee in the coffee reservoir 20 and does not contribute any bitterness to it. One or more waste stores may be provided for containing waste products (including exhausted grounds, bloom water, and other waste products) of the machine.

The brewing chamber 15 may be optionally heated or chilled (e.g., to ~4 degrees centigrade) by heating and/or cooling elements associated with it. The brewing time may vary with the temperature of the brewing chamber, from about 12 hours for RTP water to about 24-72 hours for water at 4 degrees centigrade.

The machine 10 may dilute the cold-brew coffee produced with either heated or cool (or room-temperature) water prior to serving according to user selection. This heating and/or cooling may be performed by heating and/or cooling elements associated with the pipe 25. For example the user may select via the user interface 40 to dilute the coffee to produce a drink that is 50/50 added water/coffee, and has a temperature of 10 degrees or less. This cold-brewed coffee may be prepared in concentrated form by extending the brewing cycle and preparing coffee with a relatively high TDS (e.g., 3% or more) which is then diluted to form low-TDS coffee (1-2%). Concentrated coffee has the advantage of keeping longer as it is less hospitable to microbial life, meaning it can be stored longer the an internal reservoir 20 of the machine 10 prior to serving without flavour being impaired.

In one example of such a system, high TDS coffee may then be diluted at a 1:2 ratio—one part concentrate to two parts water—to form diluted coffee with a TDS of roughly 1.05%. In another example coffee is produced as a concentrate at about 3% TDS and then diluted to about 1.5% for consumption.

Alternatively the coffee may be output directly into the receptacle 22 in concentrated form (e.g., 3-4% TDS) without first being stored in the reservoir 20 (e.g., via a by-pass pipe) for storage by the user or serving over ice (wherein the ice will be melted by it to achieve a strength of 1-2% TDS). Indeed, the user may wish to drink the concentrate, either directly or diluted with cream, milk, or ice—the machine 10 may additionally include reservoirs of each of these for automatic dispensing with the beverage.

The machine may incorporate a TDS sensor in the brewing chamber 15 and/or coffee reservoir 20, and automatically dilute the coffee output to the user to achieve a desired TDS based on feedback from the TDS sensor(s).

Fine Mesh Filter

Whilst relatively large average particle sizes such as those discussed above are considered desirable for use in making cold-brew coffee, it is possible to accelerate cold-brewing by using smaller average particulate sizes, thus increasing the surface-area over which coffee and water interfaces and increasing the rate at which solids are dissolved in the water. However, this has the draw-back of creating a "smokey" flavour and "cloudy" appearance that some users consider unpleasant, caused by excessive fine-particulate dust created during fine coffee-grinding.

However, if a particularly fine-mesh filter 17 is used the amount of this dust may be reduced. For example an average particulate size typically considered suitable for espresso coffee (e.g., an average particulate size of 500 microns or less, and more preferably 300 microns or less) may be used in combination with a particularly small-mesh filter 17 (e.g., a mesh size of about 50 microns or less, sized so as to remove visible particles from liquid) to achieve faster cold-brewing.

pH Sensor or Chemical Sensor

The main selling-point of cold-brew coffee is that it has a less bitter flavour. Experiments have shown that, for a given bean, those brewed in a French press had a pH of about 5.2 whilst those cold-brewed had a pH of about 5.5, both at RTP—a significant difference in acidity given that pH is a logarithmic scale. For other bean-types, pH levels of roughly 4.9-6 are produced by cold-brewing depending on how they are roasted, but in each case the pH-level is higher (e.g., roughly 0.2-0.4 pH higher) compared to hot-brewing. Acidity levels of roughly 50-70% lower for cold-brewed coffee compared to hot-brewed coffee with the same beans roasted the same way have also been reported.

Whilst cold-brewed coffee is typically brewed at RTP and possibly at a lower temperature, it may be performed at a temperature higher than RTP but lower than those temperatures known to lead to acidic flavour (e.g., 90 degrees or higher), thus speeding up the brewing process due to the higher rate of extraction of desired flavonoids at higher temperatures. For example a temperature of 25-75 degrees centigrade, and more preferably 30-50 may be used. This temperature depends on the beans used, the way in which they are roasted, the coarseness of the ground coffee etc.

A machine 10 may intelligently reach the appropriate temperature by controlling a heating and/or cooling element associated with the brewing chamber 15 and/or its water-supply using feedback from a pH level sensor C. A known relationship between steeping time and pH-level with the beans used (these may be input by the user manually or by scanning a bar-code on the side of the packet in which the coffee comes using a bar-code scanner associated with the machine 10) may also be used.

Ideally the target pH level is roughly 4.9-6, and more preferably roughly 5.4-5.7. A desired pH level may be selected by the user, either by directly setting the target pH, or by selecting a pre-set option (e.g., "light", "robust" etc.) from a menu of options in the user interface 40.

The machine 10 may additionally or alternatively have a chemical sensor C (e.g., chromatograph, spectrometer, or other suitable chemical sensor) directly sensitive to the specific compounds produced during hot-brewing that are undesirable, and their concentration, and lower the temperature of the heating element(s) when these are detected in an overly-high concentration for that specific stage of the brewing-process. These compounds include quinic acid, caffeic acid, citric acid, and other compounds formed by chlorogenic acid in the beans as it breaks down during roasting, or even chlorogenic acid itself, as each of these acids form a different component of the taste of the coffee. Indeed, other coffee solubles and compounds produced during brewing may also be detected by suitable chemical sensors and similarly used as feed-back by the CPU 30 for controlling the operation of the machine 10.

Differing target concentrations of each of these compounds/solubles may form a stored flavour profile selected by the user that the machine will seek to achieve by varying water quantity and temperature, coffee quantity and particulate-size, brewing chamber temperature and pressure, and other factors controllable by the CPU 30.

Carbonation/Nitrogenation

The machine 10 may allow the passing of suitable gasses such as CO2 and/or Nitrogen through and/or over the coffee from an internal tank 50. This has the intended effect of altering the flavour, the water texture, and the consistence of the coffee by nitrogenating and/or carbonating (or otherwise dissolving another gas in) the coffee to form bubbles in the coffee once the pressure under which the gas dissolves into the water is released and the beverage is returned to ambient pressure. Whilst the tank 50 is shown as internal, it may instead be an external tank, cartridge, or capsule. The amount and/or pressure of gas can be user controlled via a UI or via connectivity (e.g., wireless connectivity) to other devices.

Nitrogenation and/or carbonation may be performed on the liquid flowing through the machine up until it is dispensed. As bubble formation within the water may enhance extraction of flavonoids from the coffee grounds, it may even be useful to carbonate/nitrogenate the water prior to, or during brewing with the coffee grounds. Alternatively or additionally nitrogenation/carbonation may take place within brewed coffee reservoir 20, with the contents of the reservoir 20 being kept under pressure to aid dispensing of the contents.

It is desirable to flow the coffee through a so-called "nitro tap" or tap including a restrictor plate 200 prior to dispensing it to enhance bubble formation such as that shown in FIG. 4. A restrictor-plate 200 consists of a plate with one or more small holes 200a in it or around its circumference through which the coffee is flowed, located so that coffee flowing through a pipe is forced through it, encouraging the formation of small bubbles which feel smoother in the mouth. This plate is preferably located in the outlet 21, and the plate may be removably attachable so that multiple plates having differing hole-sizes may be used to achieve differing effects. Alternatively the plate may be integral to the outlet 21 with the outlet 21 itself being removably attached to the machine 10. For example the outlet 21 may take the form of a tap actuatable via a handle and optionally attachable via screw-thread to the pipe to which it connects. Alternatively, there may be multiple outlets 21, each having a restrictor-plate of differing hole-size, where the outlet to be used can be selected by opening the valve leading to the desired outlet, either by the user or automatically in response to a user selection. In a further alternative, restrictor plates of differing hole-size may be mounted on a carriage that is movable (either manually or automatically) to select a restrictor-plate with the desired hole-size.

Hole-size of the restrictor-plate apertures are preferably equal to or less than 1 mm in diameter, and more preferably in the range 0.3-0.7 mm in diameter, as these are known to produce bubbles having good mouth-feel. Each restrictor plate preferably has holes of roughly uniform size to provide consistency.

FIG. 3 shows an embodiment in which the restrictor plate 200 may be mounted on an actuator rod 202 that can be moved vertically upwardly or downwardly (as indicated by the arrows) either manually using a handle or automatically using a solenoid or linear actuator. When the restrictor plate 200 is located towards the wider, upper section 201a of the tap-body 201 coffee can flow around it and is not forced to flow through the apertures 200a in the restrictor plate 200. When the restrictor plate 200 is lowered into the narrower, lower section 201b of the tap-body 201, which has a hollow bore similar in diameter to that of the restrictor plate 200, coffee is forced to flow through the apertures 200a in the restrictor plate 200. When the plate 200 is lowered further into contact with flange 201c, the flange extends so as to contact with and seal the apertures 200a in the plate 200, preventing the flow of coffee through the outlet 21. The restrictor plate 200 may include an additional flexible seal around its periphery for improving the seal between it and the tap-body 201. To aid this sealing effect, the actuator rod 202 may protrude below the plate 200 and be dimensioned so as to fill the hole at the bottom of the tap-body 201, and may additionally include a flexible (e.g., rubber) seal about its lower periphery.

The gas used may be any gas suitable for forming bubbles in the liquid. Preferably the gas used in this is a mixture of Carbon dioxide and Nitrogen gas. This may be mixed at a ratio of about 25% CO2 and 75% Nitrogen gas by volume (so-called "beer gas"). Other CO2:Nitrogen ratios are possible, including 30:70, 50:50, and 60:40. Preferably the pressure of the gas is at least about 25 PSI to aid with dispensing, and more preferably still it is between about 30-40 PSI. Where the gas-supply is at a higher pressure than desired (e.g., a highly-pressurised cylinder) a regulator similar to that used in SCUBA apparatus may be provided between the supply and the beverage to reduce the gas provided to the beverage to a lower pressure, meaning that more gas may be stored. The output pressure of the regulator may be controlled via the user interface 40 or manually by adjusting a valve. The regulator could be a single-stage or double-stage regulator of any kind useful to this process chosen from the list including pressure regulators, flow regulators, pilot regulators and so-forth.

Further Reduction of Bitterness

To ensure that the cold brew coffee is not bitter like hot coffee, a neutralizing filter could be added to the machine so that the water is filtered and treated prior to it being mixed with the coffee beans. For example, the filter may be a Calcium Carbonate and/or synthetic Magnesium Oxide "filter cartridge" and be located in pipe 14. Alternatively the filter may be located after the brewing chamber 15, for example in pipe 19. This filter may take the form of a removable cartridge.

A pH sensor may be incorporated to measure the pH value of the water filled into the water tank 11. If the pH value of the water is greater than 6 than the water may be directed through, for example, Calcium Carbonate (limestone) or if the pH value is less than 6 it may be filtered through, for example, synthetic Magnesium Oxide. This arrangement would make sure that the water is not adding to the bitterness of the cold brew coffee.

Roasting of Unroasted Coffee Beans in the Machine

Figure 2:
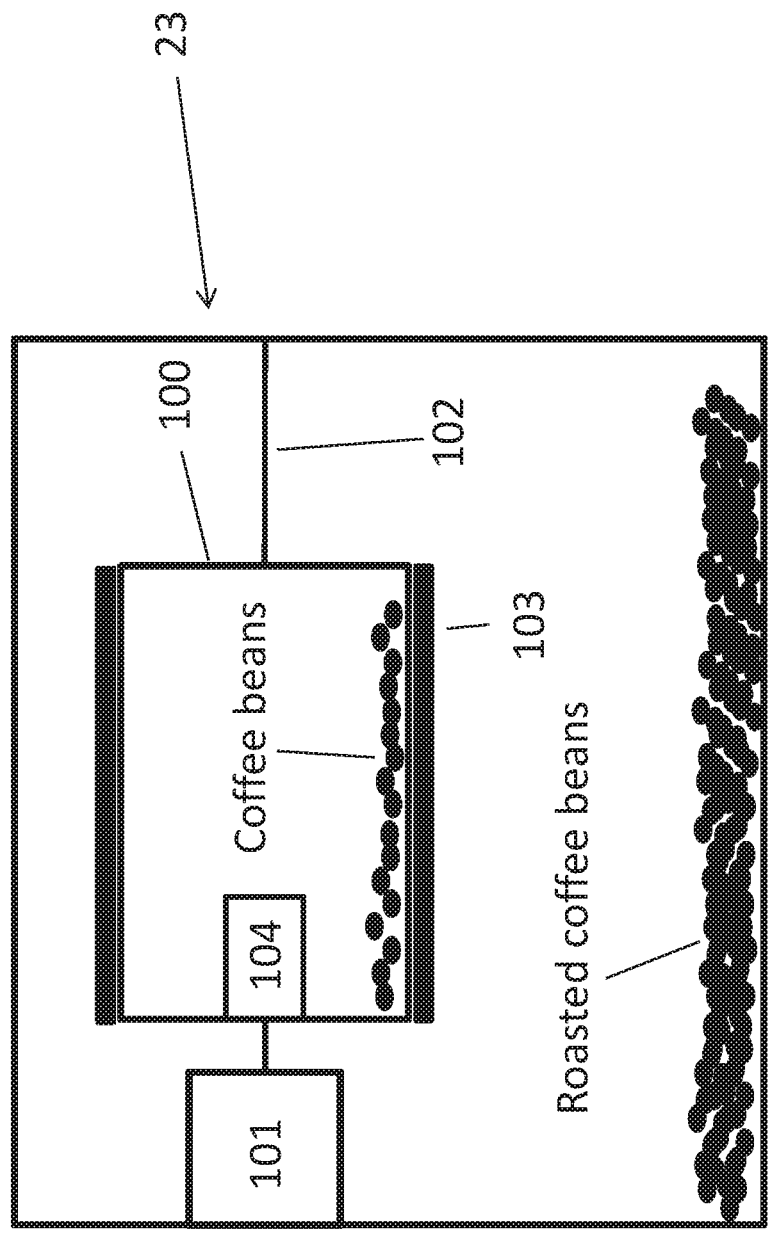
FIG. 2 is a schematic cut-away, drawing showing a bean reservoir suitable for the machine of FIG. 1.

Furthermore the machine could contain a chamber that allows for unroasted coffee beans to be roasted to an optimum point. For example, bean-reservoir 23 can additionally comprise a coffee bean roaster as shown in FIG. 2, consisting of a rotary drum 100 driven to rotate about axle 102 by motor 101 into which the beans are placed, and heating elements 103 for heating the rotary drum 100, where the rotary drum 100 is rotated during heating to ensure even roasting of the beans.

Alternatively or in addition to the rotary drum 100, other agitation means may be used for agitating the beans during roasting. This includes a motor-driven stirring paddling and/or vibration of the chamber in which the beans are roasted. Roasting may be carried out simultaneously with, before, or after grinding of the coffee by providing a heating element in the grinder 24 and/or within a suitable reservoir for ground coffee located between the grinder 24 and the brewing chamber 15.

The roasting time may be controlled either directly by the user or by CPU 30 based on user input. Light coffee beans (roasted for a shorter period of time) have a tendency to be more acidic, whereas dark coffee beans that have been roasted for a longer period of time tend to be less acidic. The roasting period, toasting temperature and colour of the coffee beans affects the bitterness/acidity/aroma of the coffee.

In order to get the right combination of 'Acidity/Aroma and Body' an algorithm may be used by the CPU 30 that comprises of inputs:
  the colour of the beans being roasted (from a RGB colour sensor 104);
  the duration of time for which the beans have been roasted (from a timer—not shown); and
  the temperature of the beans/heating element (from a temperature sensor—not shown).

From these inputs the algorithm would then determine the correct environment for the users chosen coffee type by varying the time that the beans are roasted for and the heat applied to the beans.

Once the desired roasting condition has been achieved, the beans may be released from the roaster drum 100 into a roasted bean reservoir (e.g., at the bottom of bean reservoir 23 as shown in FIG. 2) for storage.

Alternatively roasted beans could be characterized by the machine by using the RGB colour sensor 104 or by using a fixed quantity of water at a set temperature through a sample of the coffee bean and then measuring the pH value of the water after it has been passed through the coffee grind to determine the brewing time based upon the type of coffee that has been added to the machine.

Bean reservoir 23 may further include a water inlet whereby water is added (either manually or automatically from water reservoir 11) into the reservoir. This may be a brief influx of water which is then released through an outlet to clean the beans, alternatively the beans may be soaked for extended periods of time prior to grinding. The water used in either of these processes may be re-used for brewing by, e.g., directing it through an outlet-pipe into brewing chamber 15.

Bean reservoir 23 may also include a micro-perforation means for perforating the beans by e.g., piercing them with needles. Such a means may comprise a board having needles provided on it which is pressed by a linear actuator against the beans in the bean reservoir 23. This enhances penetration of the coffee beans by water, both during pre-washing/soaking, and during brewing.

Cooling Element

A cooling element 60 may be provided in thermal communication with the brewed coffee reservoir 20 for cooling the coffee within it. This cooling element 60 may be similar to the cooling system described in the applicant's patent publication number WO2017125749A2.

The cooling element 60 may further be fluidly connected to the water reservoir 11, the brewing chamber 15 and/or the brewed coffee reservoir 20 for freezing liquid taken from any of these chambers. This liquid may be frozen to form ice-crystals/chips so that a slush or slurry-type drink is formed for dispensing through outlet 21. Alternatively it may be frozen to form ice cubes that are dispensed directly into container 22 via a suitable chute to be mixed with warmer liquid coffee thus cooling it to a desired temperature without diluting its strength.

User Interface

As shown in FIG. 5, the user interface 40 may comprise one or more user interface elements for controlling the operation of the machine 10. For example, the quantity of coffee to be prepared may be selected by turning the rotary dial 41 to the desired amount.

The style in which the coffee is made may be selected via interface 42 (e.g., via a touch-screen), which may be a touch-screen interface. Selecting "Espresso" in interface 2 causes the CPU 30 to control the machine 10 to make espresso coffee in the known way. Selecting "filter" causes CPU 30 to control the machine 10 to make filter (also known as "drip") coffee in any known way. Selecting "Cold Brew" causes CPU 30 to configure the machine 10 for cold-brewing coffee in any of the ways described above. Selecting "Nitro" causes the CPU 30 to nitrogenate and/or carbonate the coffee in any of the ways described above, and may be used in combination with any of the other options of interface 42 (e.g., to produce filter coffee that is then nitrogenated/carbonated), or may be a stand-alone option that creates nitrogenated/carbonated cold-brew coffee. Options corresponding to other known styles may also be included.

Variables in the making of the coffee may be controlled using the slider interface 43 which includes multiple sliding-scales for use by the user in controlling each variable. The "Weak-Strong" slider may be used for controlling the resulting strength (e.g., TDS) of the coffee output through outlet 21 to the user in any of the ways described above. The "Cold-Hot" slider may be used for controlling the resulting temperature of the coffee output through the outlet 21 to the user in any of the ways described above. The "Light Roast-Dark Roast" slider may be used for controlling the degree of roasting of the beans in the drum 100 by altering the roasting temperature and/or time and/or the point at which the sensor 104 will detect that the beans are roasted. The "Slow Brew-Fast Brew" slider may control the degree to which the CPU 30 applies any of the methods for accelerating brewing described above. The "Fine-Coarse" slider controls the average particle size produced by the grinder 24. Whilst sliders are used here, any or all of these variables may instead be controlled by, for example, using one or more preset options corresponding to stored values for simplicity and ease of use.

Feedback may be provided to the user via the display 44. This may include a progress-bar showing the progress of the machine towards making coffee. This may also include information taken from fill-level sensors in the water tank 11, the coffee bean reservoir 23, the brewed coffee reservoir 20, and other reservoirs or stores within the machine 10 to display their fill-level to the user and alert them when they are approach an empty condition.

The user interface 40 may be displayed on the machine 10, or it may be alternatively or additionally be displayed via a mobile application operating on a mobile device to which the machine is connected wirelessly and/or through the internet.

Alternatives and Modifications

The invention described here may be used in any kitchen appliance and/or as a stand-alone device. This includes any domestic food-processing and/or preparation machine, including both top-driven machines (e.g., stand-mixers) and bottom-driven machines (e.g., food processors). It may be implemented in heated and/or cooled machines. The invention may also be implemented in both hand-held (e.g., hand blenders) and table-top (e.g., blenders) machines. It may be used in a machine that is built-in to a work-top or work surface, or in a stand-alone device. The invention can also be provided as a stand-alone device, whether motor-driven or manually powered.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances. Any reference to "food", "Beverage" (or similar language) herein may be replaced by such working mediums.

It will be understood that the present invention has been described above purely by way of example, and modifications of detail can be made within the scope of the invention, for example: whilst coffee is described as being prepared by the machine 10, any other similar beverage or food may be prepared, and separate reservoirs may be provided for containing the materials for making them. These may include tea, chocolate, and other substances that could potentially be cold-brewed. Similarly whilst a water reservoir 11 is provided, other reservoirs containing other liquids for supplying to the brewing chamber 15 may also be provided, including alcohol (for, e.g., producing a coffee-liqueur), milk (for, e.g., producing coffee-infused milk), nut-milk, fruit juices, flavoured waters, and other liquids known in the beverage field.

An agitating means, such as a stirring means, a pump, or a pressurised gas, may be included within the brewing chamber, where this agitating means is configured to encourage mixing of the ground coffee with the water. This decreases the required brewing time.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. An apparatus for providing a brewed beverage comprising:
   a brewing arrangement configured to brew a beverage according to a selected one of a plurality of brewing processes, at least one being a hot brewing processes and at least one being a cold brewing process, in which the brewing arrangement includes a brewing chamber having an inlet for a brewing substance and a brewing fluid, and an outlet for a brewed fluid;
   a user interface configured to receive a user selection comprising both: a selected beverage from options including at least one beverage brewed using the hot brewing process and at least one beverage brewed using the cold brewing process; and a selected volume of the selected beverage;
   a controller in communication with the user interface and configured to receive the user selection indicative of both the selected beverage and the volume of the beverage, and in response to the user selection, to control the brewing arrangement to carry out a selected one of the plurality of brewing processes in dependence upon the user selection to brew the required volume of the selected beverage, and to dispense from the outlet the required volume of the selected beverage; and further comprising a pressurising arrangement configured to pressurise the brewing chamber during the brewing process, wherein the pressurising arrangement is configured selectively to increase the pressure within the brewing chamber to a level above atmospheric pressure and/or to decrease the pressure within the brewing chamber to a level below atmospheric pressure in dependence upon the user selection.

2. The apparatus according to claim 1, wherein the at least one cold brewing process comprises brewing a brewing substance with a fluid at a temperature of between 25° C. and 75° C., and/or wherein the at least one hot brewing process comprises brewing a brewing substance with fluid at a temperature at or near boiling point.

3. The apparatus according to claim 1, wherein the plurality of brewing processes comprises at least one of: a filter coffee brewing process; a drip brewing process; a nitrogenated brewing process; and an espresso brewing process, and/or wherein at least one of the plurality of brewing processes comprises a hot bloom process, comprising soaking the brewing substance in a pre-brew fluid, optionally at a temperature above 80 degrees C., before brewing with the brewing fluid in the brewing chamber.

4. The apparatus according to claim 1, wherein the user selection is indicative of at least one of: a volume of the beverage; a quantity a brewing substance; a brewing time; a coarseness of a brewing substance; and a brew strength.

5. The apparatus according to claim 1, comprising a temperature controller configured to control the temperature of brewing fluid in the brewing chamber, and/or comprising a chamber heater configured to heat the brewing chamber and/or a brewing substance contained in the brewing chamber.

6. The apparatus according to claim 1, comprising a grinder configured to grind the brewing substance, the grinder preferably being controllable to provide a selected coarseness of the ground material, and wherein the grinder optionally comprises a pair of grinding elements, and is controllable to change the distance between the grinding elements, preferably wherein, when the user selection indicates a cold brewing process, the controller is configured to control the grinder to grind the substance such that the average particle size is between 1150 and 1600 microns, more preferably the average particle size is between 1300 and 1400 microns, yet more preferably the average particle size is approximately 1350 microns.

7. The apparatus according to claim 1, comprising a storage container for storing a brewed beverage, preferably wherein the storage container is in communication with the outlet of the brewing chamber.

8. The apparatus according to claim 1, comprising at least one filter for the brewing substance, wherein the filter is located within at least one of:
the brewing chamber; the chamber outlet; and a dispensing outlet of the apparatus for dispensing the brewed beverage and wherein said filter has a mesh size of about 50 microns or less, and/or comprising a pump configured to convey a brewing substance through the chamber outlet, and/or further comprising an agitating arrangement configured to agitate contents of the brewing chamber, wherein the agitating arrangement is at least one of: a stirrer, a pump, and a pressurized gas.

9. The apparatus according to claim 1, wherein the brewing chamber comprises a pH sensor arranged to sense the pH value of the brewing fluid, and wherein the controller is configured to control one or more parameters of the brewing process and/or arrangement in dependence upon the output of the pH sensor, wherein the parameters comprise at least one of: the volume of fluid supplied to the brewing chamber; the temperature of fluid and/or brewing substance supplied to or contained in the brewing chamber; the duration of brewing.

10. The apparatus according to claim 9, wherein the controller is configured to control the one or more parameters to obtain a predetermined beverage pH value, preferably of between 4.9 and 6, more preferably of between 5.4 and 5.7, yet more preferably of 5.5, and/or to obtain a pH value of the beverage corresponding to a user selection, and/or further comprising a neutralizing arrangement configured selectively to deliver a neutralizing substance, preferably comprising calcium carbonate and/or magnesium oxide, to the beverage to vary the pH of the beverage, preferably wherein the neutralizing arrangement is arranged to deliver the neutralizing substance upstream of the inlet of a brewing chamber, within a brewing chamber, or downstream of the outlet of a brewing chamber.

11. The apparatus according to claim 1, further comprising: at least one sensor comprising a chromatographic sensor and/or a spectrometer, and in which the controller is arranged to control one or more components of the brewing arrangement dependent upon the output of the sensor, and the user selection, and/or further comprising a roaster for roasting a brewing substance, preferably wherein the controller is arranged to control the roaster in dependence upon at least one of: the output of a temperature sensor; the output of a color sensor; and/or the output of a timer, and a property of the substance, and/or comprising a pressurized gas source arranged to selectively add a gas to the brewing fluid.

12. The apparatus according to claim 1, comprising a pressurized gas source arranged to selectively add a gas to the brewing fluid, and optionally further comprising a restrictor plate located at an outlet of the brewing arrangement, wherein the restrictor plate contains one or more apertures, preferably wherein the restrictor plate is moveable between a first position obstructing the outlet, and a second position not obstructing the outlet, preferably wherein the restrictor plate is further moveable to a third position partially obstructing the outlet, and preferably further comprising a dispensing arrangement configured to dispense the brewed beverage through the restrictor plate at a pressure of no less than 25 PSI, preferably at no less than 30 PSI, more preferably at between 30 and 40 PSI.

13. The apparatus according to claim 1, wherein the beverage is coffee and/or wherein the beverage is tea, and/or further comprising a dilution arrangement for diluting a brewed beverage with a fluid, preferably wherein the fluid is water, and/or wherein the beverage making apparatus is a kitchen appliance.

14. The apparatus according to claim 1, wherein the at least one cold brewing process comprises brewing a brewing substance with a fluid at a temperature of between 30° C. and 50° C., and/or wherein the at least one hot brewing process comprises brewing a brewing substance with fluid at a temperature at or near boiling point.

* * * * *